(12) United States Patent
Lapierre et al.

(10) Patent No.: US 11,606,057 B2
(45) Date of Patent: Mar. 14, 2023

(54) ELECTROMAGNETIC FILTERING OF A CONTROL CIRCUIT OF AN ELECTRIC MOTOR

(71) Applicant: Valeo Systemes Thermiques, Le Mesnil-Saint-Denis (FR)

(72) Inventors: William Lapierre, Le Mesnil Saint Denis (FR); David Bonneau, Le Mesnil Saint Denis (FR); Lucien Le Curieux-Belfond, Le Mesnil Saint Denis (FR)

(73) Assignee: Valeo Systemes Thermiques, Le Mesnil-Saint-Denis (FR)

( * ) Notice: Subject to any disclaimer, the term of this patent is extended or adjusted under 35 U.S.C. 154(b) by 65 days.

(21) Appl. No.: 17/278,708

(22) PCT Filed: Sep. 25, 2019

(86) PCT No.: PCT/FR2019/052266
§ 371 (c)(1),
(2) Date: Mar. 23, 2021

(87) PCT Pub. No.: WO2020/065221
PCT Pub. Date: Apr. 2, 2020

(65) Prior Publication Data
US 2022/0038042 A1    Feb. 3, 2022

(30) Foreign Application Priority Data

Sep. 25, 2018 (FR) ........................................ 1858770

(51) Int. Cl.
*H02P 29/50* (2016.01)
*B60R 16/03* (2006.01)
(Continued)

(52) U.S. Cl.
CPC .............. *H02P 29/50* (2016.02); *B60R 16/03* (2013.01); *F04D 25/06* (2013.01); *H02P 27/08* (2013.01)

(58) Field of Classification Search
CPC .. H02P 29/50; H02P 27/08; H02P 1/00; H02P 1/04; H02P 1/16; H02P 1/24;
(Continued)

(56) References Cited

U.S. PATENT DOCUMENTS 4,459,519 A * 7/1984 Erdman .................... H02P 6/16
                                                           62/227

FOREIGN PATENT DOCUMENTS

| EP | 3145081 A1 | 3/2017 | |
| FR | 3024613 A1 | 2/2016 | |
| JP | 2018061363 A * | 4/2018 | .............. H02M 7/48 |

OTHER PUBLICATIONS

International Search Report Issued in corresponding PCT Application No. PCT/FR2019/052266, dated Jan. 22, 2020 (5 pgs with English Translation).
(Continued)

*Primary Examiner* — Antony M Paul
(74) *Attorney, Agent, or Firm* — Osha Bergman Watanabe & Burton LLP

(57) ABSTRACT

A control circuit of an electric motor includes a filtering device in order to filter high frequencies likely to produce perturbing electromagnetic radiation when the electric motor is driven. To this end, the filtering device includes one or more filtering capacitors branched off from a power bridge driving the electric motor, wherein at least a proportion of the filtering capacitors is of a polymer-hybrid type in order to improve dynamic performance of the filtering device and to reduce its size. A motorized-fan unit for motor vehicles including such a control circuit is also disclosed.

10 Claims, 1 Drawing Sheet

(51) Int. Cl.
*F04D 25/06* (2006.01)
*H02P 27/08* (2006.01)

(58) Field of Classification Search
CPC ...... H02P 1/26; H02P 1/42; H02P 1/44; H02P 1/445; H02P 1/46; H02P 6/14; H02P 7/292; H02P 11/00; H02P 11/04; H02P 27/04; H02P 27/06; H02P 25/092; F04D 25/06; B60R 16/03; H02J 7/00; H02J 9/00; H02M 1/00; H02M 3/07
See application file for complete search history.

(56) References Cited

OTHER PUBLICATIONS

Written Opinion issued in corresponding PCT Application No. PCT/FR2019/052266, dated Jan. 22, 2020 (5 pgs).

* cited by examiner

ELECTROMAGNETIC FILTERING OF A CONTROL CIRCUIT OF AN ELECTRIC MOTOR

TECHNICAL FIELD

The technical context of the present invention is that of protection against electromagnetic radiation. More particularly, the invention relates to a control circuit of an electric motor, in particular of the type of those used in motor vehicle front face fan assemblies. The invention also relates to a motorized-fan unit for motor vehicles, driven by such a motor control circuit.

PRIOR ART

Motorized-fan units allowing regulation of an air flow sufficient to cool multiple elements of motor vehicles, such as for example an internal combustion engine or an electric circuit, are known. Such motorized-fan units comprise a rotatable fan and an electric motor for rotating the fan, the electric motor being driven by a control circuit.

The ever-increasing integration of electrical equipment in a motor vehicle leads to greater proximity among said electrical equipment. Therefore, the very operation of the various items of electrical equipment can perturb neighboring electrical equipment. Consequently, automotive manufacturers impose ever greater electromagnetic compatibility (EMC) constraints in order to guarantee reliable operation firstly of motor vehicles and secondly of the various functions provided.

These electromagnetic compatibility requirements are also imposed on the control circuit of the electric motor of motorized-fan units. This is because the generation of a pulse-width modulation control signal produces electromagnetic radiation that is likely to perturb the other electrical equipment.

It is an object of the present invention to propose a novel control circuit in order to overcome, at least to a large extent, the earlier problems and also bring about further advantages. More particularly, an aim of the invention is to reduce the electromagnetic emissions of such a control circuit during operation thereof.

Another aim is to reduce the mechanical size of the control circuit.

DISCLOSURE OF THE INVENTION

According to a first aspect of the invention, at least one of the aforementioned objectives is achieved with a motor control circuit of an electric motor, the control circuit comprising (i) a power bridge comprising at least one power branch, the power bridge being configured to drive the electric motor, and (ii) a filtering device arranged in parallel with the at least one power branch in order to filter electromagnetic radiation from the power bridge, said filtering device comprising at least one filtering capacitor, at least one filtering capacitor of the filtering device being of the polymer-hybrid type.

The electric motor driven by the electrical switch is advantageously of the type of a DC electric motor.

Each power branch of the power bridge comprises one or more—and preferably two—power switches. Each power switch is configured to generate an electrical pulse-width modulation power signal in order to control the rotation and/or speed of rotation of the electric motor to which the control circuit is connected. For this purpose, each power switch is alternately configured in an on conduction state—in which it has a very low resistance between its terminals—and in an off conduction state—in which it has a very high resistance between its terminals. Toggling the power switch between its on and off conduction states thus allows the power signal of the pulse-width modulation type to be generated and allows its characteristics, such as for example a frequency and/or a duty cycle of said power signal, to be controlled.

During its operation, the control circuit is a source of electromagnetic radiation, mainly due to the successive switching of the power switch(es) of the power bridge.

The filtering device allows sudden variations in electric current that can appear when the electric motor is rotating, and in particular when the power switches open or close when they switch from their on conduction state to their off conduction state, or vice versa, to be filtered. This is because the filtering device has an electrical impedance that is dependent on the frequency of the electric current flowing through it: for sudden variations in electric current—at the moment at which the electrical switching of the power switch is established—the electrical impedance of the filtering device is very high. On the other hand, for smaller variations in electric current—when the power switch has switched to one of its conduction states—the electrical impedance of the filtering device is very low.

In other words, the filtering device behaves essentially as a filter of low-pass type, a cutoff frequency of which determines its behavior vis-a-vis the electric current passing through it:
  beyond the cutoff frequency, the electrical impedance seen by the electric current passing through the filtering device is very large, and the electric current passing through said filtering device is thus greatly attenuated;
  below the cutoff frequency, the electrical impedance seen by the electric current passing through the filtering device is very small, and the electric current passing through said filtering device is attenuated little or not at all.

As will be examined later on, the cutoff frequency of the filtering device depends on the electrical characteristics of the components that form the filtering device, and in particular on those of the at least one polymer-hybrid filtering capacitor.

According to the invention, the singular use of polymer-hybrid technology for the filtering device makes it possible to optimize its size, both electrical and dimensional. The reason is that the use of a polymer-hybrid filtering capacitor makes it possible to increase the capacitance per unit volume of the filtering capacitor(s) of the filtering device. In other words, the capacitance of the polymer-hybrid filtering capacitor is greater, for a given volume, than that obtained for the same volume in another, non-polymer-hybrid technology. Polymer-hybrid technology thus makes it possible to improve the compactness of the filtering device of the control circuit according to the first aspect of the invention.

Furthermore, the use of polymer-hybrid technology for the filtering capacitor(s) makes it possible to offer better performance in terms of electromagnetic filtering, in particular for low frequencies.

The control circuit in accordance with the first aspect of the invention advantageously comprises at least one of the refinements below, the technical characteristics forming these refinements being able to be taken alone or in combination:
  the power switch(es) of the power bridge are of the type of a power transistor. According to a particular embodiment, the power switch(es) are of the type of a field effect transistor. More particularly still, the power switch(es) are of the type of a MOSFET, the acronym for "Metal Oxide Semiconductor Field Effect Transistor";

a capacitance value of the at least one polymer-hybrid filtering capacitor is greater than 200 µF. Preferably, the capacitance value of the at least one polymer filtering capacitor is approximately equal to 330 µF, give or take 10%;

the at least one polymer-hybrid filtering capacitor is housed in a cylindrical casing having a diameter of less than or equal to 12 mm and/or a height of less than or equal to 12 mm. Preferably, the diameter and/or the height of the casing housing the at least one polymer filtering capacitor is approximately equal to 10 mm, give or take 10%;

according to a first embodiment, each filtering capacitor of the filtering device is of the polymer-hybrid type. According to a second alternative embodiment, a first proportion of the filtering capacitors is of the electrolytic type, and a second proportion of the filtering capacitors is of the polymer-hybrid type;

the filtering device comprises a filtering inductor. This advantageous configuration makes it possible to optimize the frequency behavior of the filtering device. The combined use of polymer-hybrid technology for the filtering capacitor(s) makes it possible to decrease an inductance value of the filtering inductor. Consequently, this advantageous configuration makes it possible to reduce the costs of the filtering device along with its size and its weight;

only one of the filtering capacitors of the filtering device is of the polymer-hybrid type, the filtering capacitor of the polymer-hybrid type being located opposite the filtering inductor with respect to the power bridge. Optionally, a proportion of the filtering capacitors of the filtering device are of the polymer-hybrid type, the filtering capacitor located opposite the filtering inductor with respect to the power bridge being one of those of the polymer-hybrid type;

an inductance value of the filtering inductor is between 24.75 pH and 62.5 pH for a cutoff frequency of greater than or equal to 100 kHz;

the filtering inductor is arranged in parallel with the at least one filtering capacitor;

the filtering device is of the type of a PI filter, said PI filter being formed by the filtering inductor located between two filtering capacitors arranged in parallel with one another. This advantageous configuration makes it possible to obtain a low-pass filter, a cutoff frequency of which is determined by impedance values of the filtering inductor and the filtering capacitors;

the filtering device comprises a number of filtering capacitors equal to a number of power branches of the power bridge. In particular, according to one particular embodiment of the invention, the control circuit is triphasic, the number of power branches of the power bridge being equal to three, and the number of filtering capacitors being equal to three.

According to a second aspect of the invention, a motorized-fan unit for motor vehicles is proposed, said motorized-fan unit comprising (i) a fan rotated by an electric motor, and (ii) a control circuit in accordance with the first aspect of the invention or in accordance with any one of the refinements thereof, said control circuit being configured to drive the electric motor.

The control circuit is configured to control a speed of rotation and/or a direction of rotation of the electric motor and, consequently, of the associated fan. As set out above, the motorized-fan unit according to the second aspect has a higher level of electromagnetic compatibility with respect to previous motorized-fan units, for a reduced size owing to the use of the polymer-hybrid capacitor(s) in the filtering device.

Varying embodiments of the invention are foreseeable, these incorporating the various optional features explained here in all of their possible combinations.

DESCRIPTION OF THE FIGURES

Further features and advantages of the invention will become apparent from the following description and from several exemplary embodiments given as non-limiting examples with reference to the attached schematic drawings, in which.

Of course, the features, variants and different embodiments of the invention can be combined with one another, in various combinations, provided that they are not incompatible or mutually exclusive. In particular, variants of the invention can be envisaged that comprise only a selection of the features described below in isolation from the other features described, if this selection of features is sufficient to provide a technical advantage or to distinguish the invention from the prior art.

In particular, all of the variants and all of the embodiments described can be combined with each other if there is no technical reason preventing this combination.

In the figures, elements common to a number of figures keep the same reference.

DETAILED DESCRIPTION OF THE INVENTION

Figure 1:
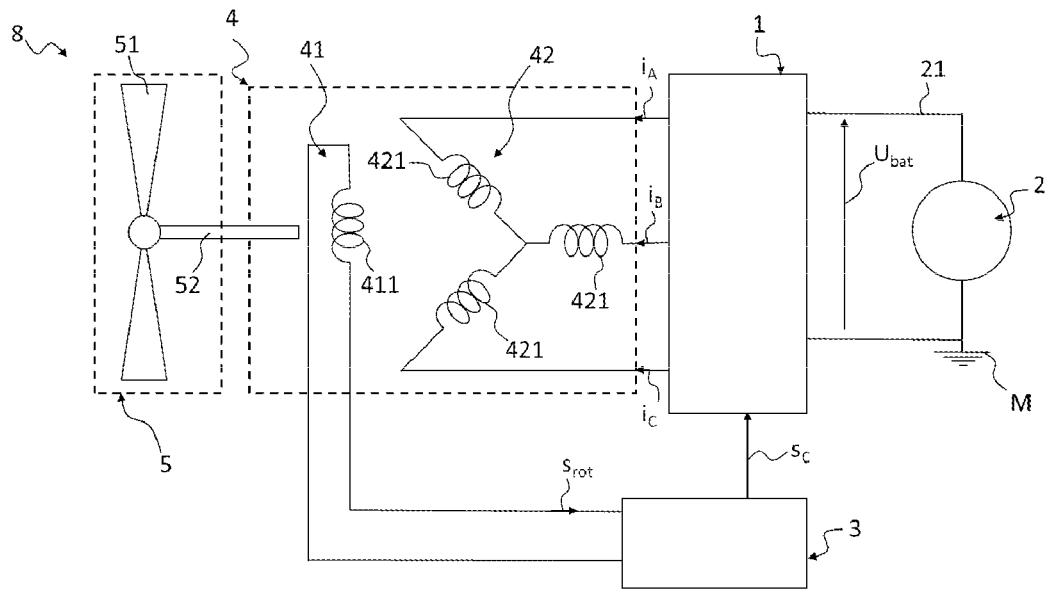
FIG. 1 illustrates a circuit diagram of an electric motor driven by a control circuit in accordance with the first aspect of the invention.

FIG. 1 illustrates an electrical system intended to be installed for example in a motor vehicle, not shown, and an electric power for which—represented by a voltage $U_{bat}$—is provided by a battery 2 via a vehicle electrical system 21. In the example illustrated in FIG. 1, such an electrical system forms a motorized-fan unit 8 in accordance with the third aspect of the invention.

Such a motorized-fan unit 8 comprises an electric motor 4 driven by a control circuit 1, a rotor of the electric motor 4 being mechanically coupled to a shaft 52 rotating a propeller 51 of a fan 5. The control circuit 1 is in accordance with the first aspect of the invention and will be described later on with reference to FIG. 2.

The electric motor 4 driven by the control circuit 1 can be of any type, and in particular of the type of a DC motor, for example. The electric motor 4 comprises an armature element 41 and an inductor element 42. In the example illustrated in FIG. 1, the armature element 41 is a rotor of the electric motor 4; and the inductor element 42 is a stator of said electric motor 4. Advantageously, the inductor element 42 comprises a number N of electrical windings 421. In the example illustrated in FIG. 1, N is equal to 3. According to a particular embodiment of the invention, the electrical windings 421 of the inductor element 42 are arranged in a so-called "star" electrical configuration, all the electrical windings 421 being electrically connected to one another at a common electrical terminal. Alternatively, other electrical configurations can be envisaged, such as for example a delta or ring configuration.

The electric motor 4 is driven by a control circuit 1 that allows selective or collective production of the phase currents $i_A$, $i_B$, $i_C$ of each of the electrical windings 421 of the inductor element 42 of said electric motor 4. The control circuit 1 is itself driven by a control module 3 that generates one or more control signals sc for the control circuit 1, as will be described in more detail with reference to FIG. 2. In addition, the control module 3 is also configured to determine an induced current $i_{rot}$ at the armature element 41 of the electric motor 4.

The control circuit 1 is branched off from the battery 2 of the motor vehicle, between a positive terminal and a ground terminal M, through the vehicle electrical system 21. The ground terminal M is advantageously electrically connected to a chassis of the motor vehicle for reasons of electrical safety.

Figure 2:
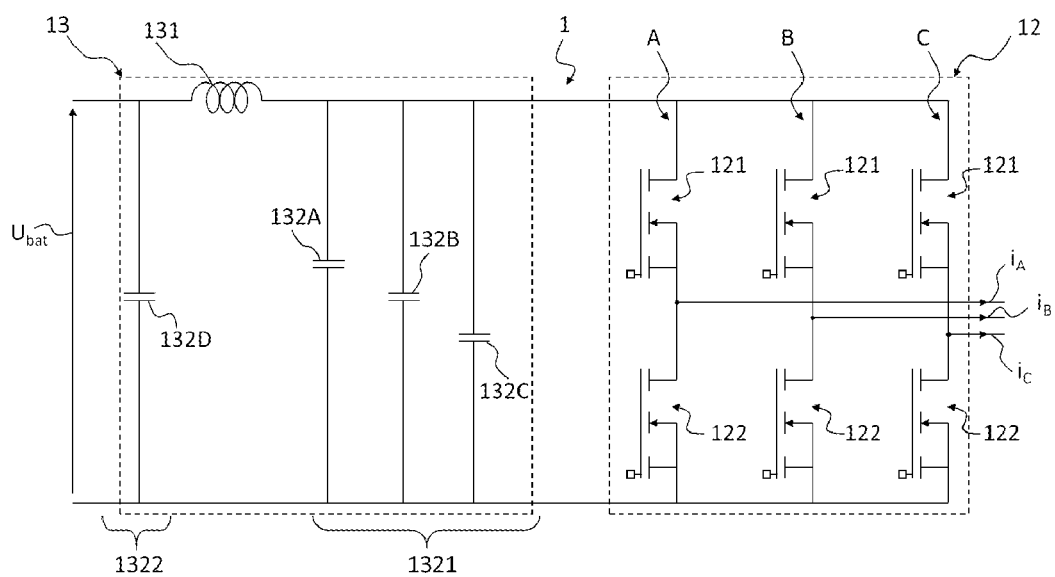
FIG. 2 illustrates an exemplary embodiment of such a control circuit in accordance with the first aspect of the invention.

With reference to FIG. 2, a control circuit 1 in accordance with the first aspect of the invention comprises a power bridge 12 and a filtering device 13.

The power bridge 12 comprises at least one power branch A, B, C, in order to produce at least one phase current $i_A$, $i_B$, $i_C$ for each of the electrical windings 421 of the inductor element 42 of said electric motor 4. All the power branches A, B, C are firstly branched off from one another, and polarized by the voltage $U_{bat}$ delivered by the battery 2 of the motor vehicle. In the example illustrated in FIG. 2, in correspondence with the motorized-fan unit 8 illustrated in FIG. 1, the power bridge 12 comprises three power branches A, B, C, each of the power branches A, B, C being associated with one of the electrical windings 421.

Each power branch A, B, C comprises two power switches 121. Each power switch 121 is configured to produce the corresponding phase current $i_A$, $i_B$, $i_C$. The phase current $i_A$, $i_B$, $i_C$ produced by the power switches of each branch A, B, C of the control circuit 1 is of the type of a pulse-width modulation signal in order to control the rotation and/or the speed of rotation of the electric motor 4. For this purpose, each power switch 121 is alternately configured in an on conduction state—in which it has a very low resistance between its terminals—and in an off conduction state—in which it has a very high resistance between its terminals. The toggling of the power switches 121 between their on and off conduction states is driven by the control module 3 and allows the characteristics of the corresponding phase currents $i_A$, $i_B$, $i_C$, such as for example a frequency and/or a duty cycle, to be controlled.

Each power switch 121 is advantageously of the type of a power transistor, such as for example a MOS, a MOSFET, preferably N doped as in the example illustrated in FIG. 2.

For each power branch A, B, C, the two power switches 121 are advantageously electrically connected at a common terminal, for example via a drain terminal of a first power transistor and via a source terminal of a second power transistor of the same power branch A, B, C. Subsequently, the terminal common to the two power components 121 is then electrically connected to one of the electrical windings 421 of the electric motor 4 in order to control an electric current flowing through it.

In order to filter electromagnetic radiation from the power bridge 12 during operation thereof, the filtering device 13 is configured to carry out low-pass filtering. For this purpose, the filtering device 13 comprises at least one filtering capacitor 132A, 132B, 132C, 132D. Each filtering capacitor 132A-132D is firstly branched off from the power bridge 12 and secondly placed in parallel with the voltage $U_{bat}$ delivered by the battery 2 of the motor vehicle.

In the example illustrated in FIG. 2, the filtering device 13 is advantageously of the type of a PI filter. It comprises a first group of filtering capacitors 1321 and a second group of filtering capacitors 1322. The first 1321 and the second 1322 group of filtering capacitors are separated by a filtering inductor 131 arranged in series between them.

An inductance value of the filtering inductor 131 and a capacitance value for each of the filtering capacitors 132A-132D are advantageously chosen in order to determine a cutoff frequency of the filtering device 13, according to the desired effects and the electrical and dynamic characteristics of the electric motor 4 and/or the control circuit 1, and in particular the power bridge 12.

In accordance with the invention according to its first aspect, at least one of the filtering capacitors 132A-132D is of the polymer-hybrid type in order to reduce its dimensions and in order to increase its capacitance, as mentioned above. According to a first possible embodiment, only the filtering capacitor 132D of the second group 1322 of filtering capacitors is of the polymer-hybrid type. In other words, according to the first embodiment, only the filtering capacitor located toward the electrical battery 2 with respect to the filtering inductor 131 is of the polymer-hybrid type.

According to a second possible embodiment, which is additional to the first embodiment, at least a proportion of the filtering capacitors 131A-132C of the first group 1321 are of the polymer-hybrid type. More preferably still, all of the filtering capacitors 131A-132C of the first group 1321 are of the polymer-hybrid type.

Cleverly, the invention aims to replace each filtering capacitor 132A-132D of the first 1321 and/or second 1322 group that has a capacitance value higher than 100 µF with a capacitor of polymer-hybrid type. In exchange, this advantageous configuration makes it possible to undersize the filtering inductor 131 by reducing its inductance value, thus allowing both the costs of manufacturing the control circuit 1 and the dimensional size of the filtering device 13 to be reduced. Quite particularly, the filtering capacitor(s) of the polymer-hybrid type used in the filtering device 13 have a capacitance value equal to around 330 µF.

In summary, the invention relates to a control circuit 1 of an electric motor 4, the control circuit 1 comprising a filtering device 13 in order to filter the high frequencies likely to produce perturbing electromagnetic radiation when the electric motor 4 is driven. To this end, the filtering device 13 comprises one or more filtering capacitors 132A-132D branched off from a power bridge 12 driving the electric motor 4, at least a proportion of the filtering capacitors 132A-132D being of the polymer-hybrid type in order to improve the dynamic performance of the filtering device 13 and to reduce its size.

Of course, the invention is not limited to the examples that have just been described, and numerous modifications can be made to these examples without departing from the scope of the invention. In particular, the various features, forms, variants and embodiments of the invention can be associated with each other, in various combinations, provided that they are not incompatible or mutually exclusive. In particular, all of the variants and embodiments described above can be combined with each other.

The invention claimed is:

1. A control circuit of an electric motor, the control circuit comprising:

a power bridge comprising at least one power branch, the power bridge being configured to drive the electric motor;

a filtering device arranged in parallel with the at least one power branch to filter electromagnetic radiation from the power bridge, said filtering device comprising at least one filtering capacitor;

wherein the at least one filtering capacitor of the filtering device is of a polymer-hybrid type, and wherein the filtering device comprises a filtering inductor.

2. The control circuit as claimed in claim 1, wherein a capacitance value of the at least one polymer-hybrid filtering capacitor is greater than 200 μF.

3. The control circuit as claimed in claim 1, wherein the at least one polymer-hybrid filtering capacitor is housed in a cylindrical casing having a diameter of less than or equal to 12 mm and/or a height of less than or equal to 12 mm.

4. The control circuit as claimed in claim 1, wherein each filtering capacitor of the filtering device is of the polymer-hybrid type.

5. The control circuit as claimed in claim 1, wherein the filtering inductor is arranged in parallel with the at least one filtering capacitor.

6. The control circuit as claimed in claim 1, wherein the filtering device is of the type of a PI filter, said PI filter being formed by the filtering inductor located between two filtering capacitors arranged in parallel with one another.

7. The control circuit as claimed in claim 1, wherein the filtering device comprises a number of filtering capacitors equal to a number of power branches of the power bridge.

8. The control circuit as claimed in claim 7, wherein the number of power branches of the power bridge is equal to three, and the number of filtering capacitors is equal to three.

9. A motorized-fan unit for motor vehicles, said motorized-fan unit comprising:

a fan rotated by an electric motor; and a control circuit configured to drive the electric motor, the control circuit comprising a power bridge comprising at least one power branch, the power bridge being configured to drive the electric motor;

a filtering device arranged in parallel with the at least one power branch to filter electromagnetic radiation from the power bridge, said filtering device comprising at least one filtering capacitor;

wherein the at least one filtering capacitor of the filtering device is of a polymer-hybrid type, and wherein the filtering device comprises a filtering inductor.

10. A control circuit of an electric motor, the control circuit comprising:

a power bridge comprising at least one power branch, the power bridge being configured to drive the electric motor;

a filtering device arranged in parallel with the at least one power branch to filter electromagnetic radiation from the power bridge, said filtering device comprising at least one filtering capacitor;

wherein the at least one filtering capacitor of the filtering device is of a polymer-hybrid type, and wherein a capacitance value of the at least one polymer-hybrid filtering capacitor is greater than 200 μF.

* * * * *